US012777417B2

(12) United States Patent
Lyu et al.

(10) Patent No.: US 12,777,417 B2
(45) Date of Patent: Oct. 27, 2026

(54) METHOD AND DEVICE FOR WIRELESS COMMUNICATION

(71) Applicant: QUECTEL WIRELESS SOLUTIONS CO., LTD., Shanghai (CN)

(72) Inventors: Ling Lyu, Shanghai (CN); Zheng Zhao, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 19/410,241

(22) Filed: Dec. 5, 2025

(65) Prior Publication Data

US 2026/0089630 A1 Mar. 26, 2026

Related U.S. Application Data

(63) Continuation of application No. PCT/CN2024/115170, filed on Aug. 28, 2024.

(51) Int. Cl.
*H04W 52/02* (2009.01)
*H04W 68/00* (2009.01)

(52) U.S. Cl.
CPC ... *H04W 52/0219* (2013.01); *H04W 52/0229* (2013.01); *H04W 68/005* (2013.01)

(58) Field of Classification Search
CPC ..... H04W 72/23; H04W 68/02; H04W 68/00; H04W 68/025; H04W 52/367; H04W 52/0219
See application file for complete search history.

(56) References Cited

FOREIGN PATENT DOCUMENTS

| | | | | |
|---|---|---|---|---|
| CN | 118265131 A | * | 6/2024 | ........ H04W 52/0229 |
| WO | WO-2022165756 A1 | * | 8/2022 | ........... H04L 5/0053 |

* cited by examiner

*Primary Examiner* — Khalid W Shaheed
(74) *Attorney, Agent, or Firm* — Fish & Richardson P.C.

(57) ABSTRACT

Provided are a method and a device for wireless communication. One example method includes: receiving a first wake-up signal at a first occasion, wherein the first wake-up signal is to wake up a second communication module of a first terminal device, wherein the first terminal device comprises a first communication module and the second communication module, and the first wake-up signal is received through the first communication module of the first terminal device; and performing paging detection at a second occasion, wherein the paging detection is performed by the second communication module, the first occasion is determined based on a first waked terminal device group to which the first terminal device belongs, and the second occasion is determined based on the first waked terminal device group and a first paging device group to which the first terminal device belongs.

20 Claims, 3 Drawing Sheets

METHOD AND DEVICE FOR WIRELESS COMMUNICATION

CROSS-REFERENCE TO RELATED APPLICATIONS

This application is a continuation of International Application No. PCT/CN2024/115170, filed on Aug. 28, 2024, the disclosure of which is hereby incorporated by reference in its entirety.

TECHNICAL FIELD

The present disclosure relates to the field of communication technologies, and more specifically, to a method and a device for wireless communication.

BACKGROUND

To reduce power consumption caused by periodic paging message detection in terminal devices, some communication systems have introduced a Low-Power Wake-Up Signal (LP-WUS). For example, the terminal devices may receive the LP-WUS transmitted by a network device through a low-power wake-up module that operates independently of a main communication module. Therefore, how the terminal devices perform paging detection based on the LP-WUS is a critical issue to address.

SUMMARY

This disclosure provides a method and a device for wireless communication. The following describes various aspects of the embodiments of this disclosure.

A first aspect provides a method for wireless communication, applied to a first terminal device including a first communication module and a second communication module, the method including: receiving a first wake-up signal at a first occasion, where the first wake-up signal is configured to wake up the second communication module; performing paging detection at a second occasion, where the first wake-up signal is received through the first communication module, and the paging detection is performed by the second communication module; the first occasion is determined based on a first waked terminal device group to which the first terminal device belongs; the second occasion is determined based on the first waked terminal device group and a first paging device group to which the first terminal device belongs.

A second aspect provides a method for wireless communication, including: transmitting a first wake-up signal to a first terminal device at a first occasion, where the first terminal device includes a first communication module and a second communication module, and the first wake-up signal is configured to wake up the second communication module of the first terminal device; transmitting paging information corresponding to the first terminal device at a second occasion, where the first wake-up signal is received by the first communication module, and the paging information is detected by the second communication module; the first occasion is determined based on a first waked terminal device group to which the first terminal device belongs; the second occasion is determined based on both the first waked terminal device group and a first paging device group to which the first terminal device belongs.

A third aspect provides a device for wireless communication, the device being a first terminal device, including:

a first communication module, configured to receive a first wake-up signal at a first occasion, where the first wake-up signal is configured to wake up a second communication module of the first terminal device; a second communication module, configured to perform paging detection at a second occasion; where the first occasion is determined based on a first waked terminal device group to which the first terminal device belongs, and the second occasion is determined based on both the first waked terminal device group and a first paging device group to which the first terminal device belongs.

A fourth aspect provides an device for wireless communication, the device being a network device, including: a first transmission module, configured to transmit a first wake-up signal to a first terminal device at a first occasion, where the first terminal device includes a first communication module and a second communication module, and the first wake-up signal is configured to wake up the second communication module of the first terminal device; a second transmission module, configured to transmit paging information corresponding to the first terminal device at a second occasion; where the first wake-up signal is received by the first communication module, and the paging information is detected by the second communication module; the first occasion is determined based on a first waked terminal device group to which the first terminal device belongs; the second occasion is determined based on both the first waked terminal device group and a first paging device group to which the first terminal device belongs.

A fifth aspect provides a communication device, including a memory and a processor, where the memory is configured to store a program, and the processor is configured to call the program from the memory to perform the method according to the first aspect or the second aspect.

A sixth aspect provides a device, including a processor configured to call a program from a memory to perform the method according to the first aspect or the second aspect.

A seventh aspect provides a chip, including a processor configured to call a program from a memory, to enable a device installed with the chip to perform the method according to the first aspect or the second aspect.

A eighth aspect provides a computer-readable storage medium, storing a program that, when executed by a computer, causes the computer to perform the method according to the first aspect or the second aspect.

A ninth aspect provides a computer program product, including a program that, when executed by a computer, causes the computer to perform the method according to the first aspect or the second aspect.

A tenth aspect provides a computer program that, when executed by a computer, causes the computer to perform the method according to the first aspect or the second aspect.

In the embodiments of this disclosure, the first terminal device may first receive the first wake-up signal via the first communication module and then wake up the second communication module and perform paging detection via the second communication module. The occasion for receiving the first wake-up signal is determined based on a wake-up signal grouping, while the occasion for paging detection is jointly determined based on both the wake-up signal grouping and a paging grouping. Thus, when the terminal device performs paging detection based on joint grouping, the probability of the terminal device performing unnecessary paging detection at non-relevant paging occasions is effectively reduced.

DETAILED DESCRIPTION OF THE EMBODIMENTS

Figure 1:
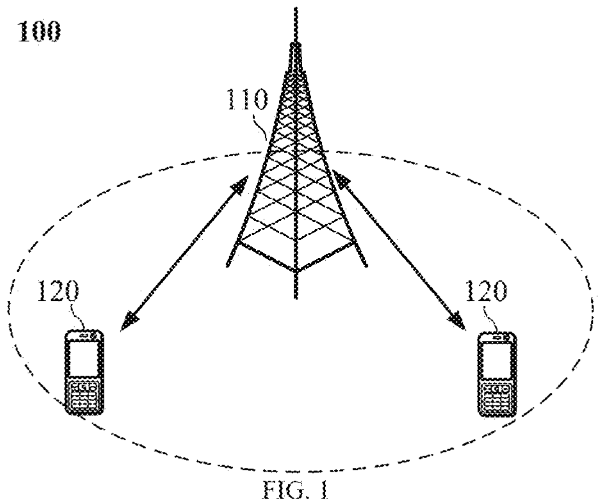
FIG. 1 is a diagram of a wireless communication system to which embodiments of this disclosure are applied.

The following describes technical solutions in the embodiments of this disclosure with reference to the accompanying drawings in the embodiments of this disclosure. Obviously, the described embodiments are only part rather than all of the embodiments of this disclosure. All other embodiments obtained by persons of ordinary skill in the art based on the embodiments of this disclosure shall fall within the protection scope of this disclosure.

The embodiments of this disclosure may be applied to various communication systems. For example, the embodiments may be applied to a Global System for Mobile Communications (GSM) system, Time Division Multiple Access (TDMA), Frequency Division Multiple Access (FDMA), Orthogonal Frequency Division Multiple Access (OFDMA), Single-Carrier Frequency Division Multiple Access (SC-FDMA), Code Division Multiple Access (CDMA) system, Wideband Code Division Multiple Access (WCDMA) system, General Packet Radio Service (GPRS) system, Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Universal Mobile Telecommunications System (UMTS), Wireless Local Area Network (WLAN) system, Wireless Fidelity (WiFi) system, or 5th-Generation (5G) system. The embodiments may also be applied to other communication systems and radio technologies, such as 6th-Generation (6G) mobile communication systems, satellite communication systems, or other future communication systems.

Traditional communication systems support limited connections and are easy to implement. However, with the development of communication technologies, communication systems can support not only traditional cellular communication but also one or more other types of communication. For example, the communication system may support one or more of the following communications: Device-to-Device (D2D) communication, Machine-to-Machine (M2M) communication, Machine Type Communication (MTC), enhanced MTC (eMTC), Vehicle-to-Vehicle (V2V) communication, and Vehicle-to-Everything (V2X) communication. The embodiments of this disclosure may also be applied to communication systems supporting the above communication methods.

The communication system in the embodiments of this disclosure may be applied to Carrier Aggregation (CA) scenarios, Dual Connectivity (DC) scenarios, or Standalone (SA) deployment scenarios.

The communication system in the embodiments of this disclosure may be applied to unlicensed spectrum. The unlicensed spectrum may also be considered as shared spectrum. Alternatively, the communication system in the embodiments of this disclosure may also be applied to licensed spectrum. The licensed spectrum may also be considered as dedicated spectrum.

The embodiments of this disclosure may be applied to Non-Terrestrial Network (NTN) systems. As an example, the NTN system may be a 4G-based NTN system, an NR-based NTN system, an Internet of Things (IoT)-based NTN system, or a Narrow Band Internet of Things (NB-IoT)-based NTN system.

The communication system may include one or more terminal devices. The terminal device mentioned in the embodiments of this disclosure may also be referred to as User Equipment (UE), access terminal, subscriber unit, subscriber station, mobile station, Mobile Station (MS), Mobile Terminal (MT), remote station, remote terminal, mobile device, user terminal, terminal, wireless communication device, user agent, or user apparatus. It should be noted that a specific type of the terminal device is not limited in the embodiments of this disclosure.

In some embodiments, the terminal device may be a Station (ST) in a WLAN. In some embodiments, the terminal device may be a cellular phone, a cordless phone, a Session Initiation Protocol (SIP) phone, a Wireless Local Loop (WLL) station, a Personal Digital Assistant (PDA) device, a handheld device with wireless communication capabilities, a computing device, another processing device connected to a wireless modem, a vehicle-mounted device, a wearable device, a terminal device in a next-generation communication system (e.g., an NR system), or a terminal device in a future evolved Public Land Mobile Network (PLMN).

In some embodiments, the terminal device may be a device that provides voice and/or data connectivity to users. For example, the terminal device may be a handheld device with wireless connection capabilities or a vehicle-mounted device. As some specific examples, the terminal device may be a mobile phone, tablet personal computer, Personal Computer (PC), laptop computer (or notebook computer), Personal Digital Assistant (PDA), palmtop computer, netbook, Ultra-Mobile Personal Computer (UMPC), Mobile Internet Device (MID), wearable device, robot, Virtual Reality (VR) device, Augmented Reality (AR) device, wireless terminal in industrial control, wireless terminal in self-driving, wireless terminal in remote medical surgery, wireless terminal in smart grid, wireless terminal in transportation safety, wireless terminal in smart city, Vehicle UE (VUE), Pedestrian UE (PUE), smart home device (home appliance with wireless communication functions, such as refrigerators, televisions, washing machines, or furniture), game console, ATM, self-service machine or other terminal-side devices.

As an example, wearable devices include smart watches, smart bracelets, smart earphones, smart glasses, smart jewelry (smart bracelets, smart rings, smart necklaces, smart anklets, etc.), smart wristbands, smart clothing, and the like.

In some embodiments, the terminal device may be deployed on land, such as indoors or outdoors. In some embodiments, the terminal device may be deployed on water, such as on ships. In some embodiments, the terminal device may be deployed in the air, such as on airplanes, balloons, or satellites.

In addition to terminal devices, the communication system may further include one or more network devices. The network device in the embodiments of this disclosure may be a device for communicating with terminal devices. The network device may also be referred to as an access network device, radio access network device, Radio Access Network (RAN), radio access network function, or radio access network unit. The network device in the embodiments of this disclosure may be a RAN node (or device) that connects terminal devices to a wireless network. The network device may be, for example, a base station, WLAN access point, or WiFi node. The network device may broadly cover various names or be replaced with the following names: NodeB (NodeB), evolved NodeB (eNB), next-generation NodeB (gNB), relay station, Access Point (AP), Base Transceiver Station (BTS), radio base station, radio transceiver, Basic Service Set (BSS), Extended Service Set (ESS), home NodeB, home evolved NodeB, Transmitting and Receiving Point (TRP), Transmitting Point (TP), Master eNB (MeNB), Secondary eNB (SeNB), Multi-Standard Radio (MSR) node, home base station, network controller, access node, radio node, transmission node, transceiver node, Baseband Unit (BBU), Remote Radio Unit (RRU), Active Antenna Unit (AAU), Remote Radio Head (RRH), Central Unit (CU), Distributed Unit (DU), positioning node, or other suitable terms in the field. As long as the same technical effect is achieved, the base station is not limited to specific technical terms. For example, the base station may also be a macro base station, micro base station, relay node, donor node, or the like, or a combination thereof. The base station may also refer to a communication module, modem, or chip installed in the aforementioned devices or apparatuses. The base station may also be a mobile switching center, a device with base station functions in D2D, V2X, or M2M communications, a network-side device in 6G networks, or a device with base station functions in future communication systems. The base station may support networks with the same or different access technologies. The embodiments of this disclosure do not limit the specific technology or device form adopted by the network device.

The base station may be fixed or mobile. For example, helicopters or drones may be configured to act as mobile base stations, and one or more cells may move according to the location of the mobile base stations. In other examples, helicopters or drones may be configured to act as devices communicating with other base stations.

In some deployments, the network device in the embodiments of this disclosure may refer to a CU or DU, or the network device may include both CU and DU. The gNB may also include an AAU.

As an example and not a limitation, in the embodiments of this disclosure, the network device may have mobility characteristics. For example, the network device may be a mobile device. In some embodiments of this disclosure, the network device may be a satellite or a balloon station. In some embodiments of this disclosure, the network device may also be a base station deployed on land or water.

In the embodiments of this disclosure, the network device may provide services for a cell. The terminal device communicates with the network device using transmission resources (e.g., frequency domain resources or spectrum resources) used by the cell. The cell may be a cell corresponding to the network device (e.g., a base station). The cell may belong to a macro base station or a base station corresponding to a small cell. The small cell may include a metro cell, a micro cell, a pico cell, a femto cell, and the like. These small cells have characteristics of small coverage and low transmission power and are suitable for providing high-speed data transmission services.

As an example, FIG. 1 is a schematic diagram of a communication system architecture according to an embodiment of this disclosure. As shown in FIG. 1, the communication system 100 may include a network device 110, which may be a device communicating with a terminal device 120 (also referred to as a communication terminal or a terminal). The network device 110 may provide communication coverage for a specific geographic area and may communicate with terminal devices located within the coverage area.

FIG. 1 exemplarily shows one network device and two terminal devices. In some embodiments of this disclosure, the communication system 100 may include multiple network devices, and the coverage area of each network device may include other numbers of terminal devices, which is not limited herein.

In the embodiments of this disclosure, the network-side devices in the communication system may include access network devices or core network devices. For example, the communication system shown in FIG. 1 may further include a Mobility Management Entity (MME), an Access and Mobility Management Function (AMF) and other network entities which are not limited in the embodiments of this disclosure.

It should be understood that devices with communication functions in the network/system in the embodiments of this disclosure may be referred to as communication devices. Taking the communication system 100 shown in FIG. 1 as an example, communication devices may include the network device 110 and the terminal device 120 with communication functions. The network device 110 and the terminal device 120 may be the specific devices described above, which will not be repeated here. The communication devices may also include other devices in the communication system 100, such as network controllers, mobility management entities and other network entities, which are not limited in the embodiments of this disclosure.

For ease of understanding, some related technical knowledge involved in the embodiments of this disclosure is first introduced. The following related technologies may be optionally combined with the technical solutions of the embodiments of this disclosure in any manner, all of which fall within the protection scope of the embodiments of this disclosure. The embodiments of this disclosure include at least part of the following content.

With the development of mobile communication technologies, the disclosure fields of the Internet of Things (IoT) are gradually expanding. However, without the support of an external power source, 5G IoT devices are difficult to implement in practice. This is because 5G devices in cellular networks consume tens of milliwatts of power even when they are not transmitting or receiving any data. This idle power consumption is due to the fact that 5G devices must perform periodic measurements and check for potential paging messages.

To reduce the power consumption of terminal devices, the NR system has introduced a low-power wake-up module and LP-WUS. The low-power wake-up module is also called a Low-Power Wake-Up Receiver (LP-WUR) or Low-Power Wake-Up Radio (LP-WUR). For example, when idle, a terminal device may turn off the main communication module/receiver or set the main communication module/receiver to a deep sleep state, while using only the LP-WUR to monitor LP-WUS, thereby achieving a goal of reducing power consumption. The main communication module/receiver of the terminal device may also be referred to as the Main Radio (MR), and correspondingly, the low-power wake-up module may be abbreviated as LR. When the MR is awakened, the terminal device may enter a Radio Resource Control (RRC) connected state. The LP-WUR of the terminal device, however, can remain continuously active to receive LP-WUS. Therefore, the LP-WUR can operate independently of the 5G device, meaning the 5G device may remain powered off while the LP-WUR is active and searching for potential LP-WUS. To ensure the low-power performance of terminal devices, LP-WUS must be embedded into relevant communication systems (e.g., the NR system).

In some embodiments, LP-WUS may support a bandwidth of 5 MHz to 20 MHz. When LP-WUS is embedded into a relevant communication system, the main communication module (or MR) and the low-power wake-up module (LP-WUR or LR) on the terminal device side may exist as two separate modules or be integrated into a single module. The LP-WUR may support multiple receiver architectures. Below, three receiver architectures shown in FIGS. 2 to 4 are used as examples to illustrate the LP-WUR.

Figure 2:
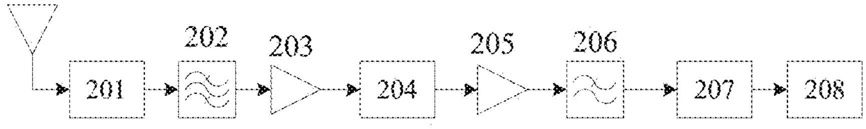
FIG. 2 is a schematic diagram of a possible structure of a low-power wake-up module applicable to embodiments of this disclosure.

FIG. 2 shows a schematic structural diagram of an LP-WUR based on Radio Frequency (RF) envelope detection. The receiver architecture in FIG. 2 includes a Matching Network (201), an RF Bandpass Filter (BPF, 202), an RF Low-Noise Amplifier (LNA, 203), an RF Envelope Detector (204), a Baseband (BB) Asymmetric Processing (AMP, 205), a BB Low-Pass Filter (LPF, 206), a 1-bit or multi-bit Analog-to-Digital Converter (ADC, 207), and Digital BB Processing (208).

In the architecture shown in FIG. 2, the RF signal is directly converted to a baseband signal through an RF envelope detector. Since there is no Local Oscillator (LO) or Phase-Locked Loop (PLL), relatively low power consumption can be achieved. Optionally, this architecture may include a 1-bit or multi-bit ADC, RF LNA, and/or BB AMP, a high-Q matching network, and/or RF BPF and/or BB LPF. Optionally, to support multiple frequency bands and/or carriers, multiple high-Q matching networks and/or RF BPFs or multiple off-chip components may be required to suppress adjacent channel interference or interference from legacy NR signals and/or other LP-WUS on adjacent subcarriers, as well as to support frequency band and/or carrier tuning.

Figure 3:
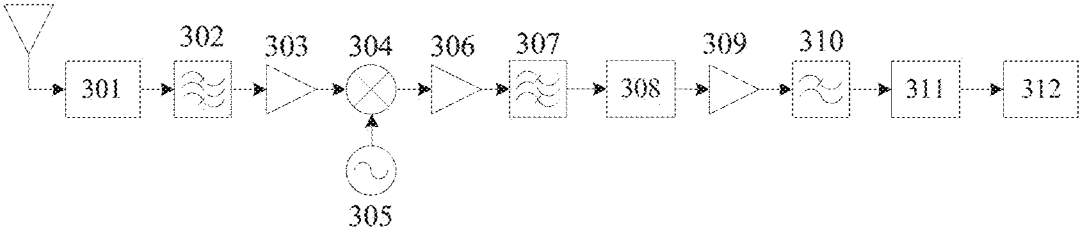
FIG. 3 is a schematic diagram of another possible structure of a low-power wake-up module applicable to embodiments of this disclosure.
Figure 4:
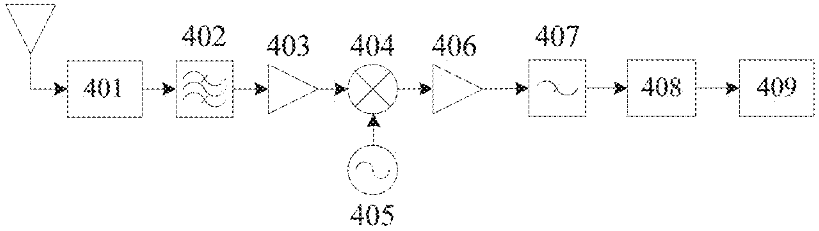
FIG. 4 is a schematic diagram of yet another possible structure of a low-power wake-up module applicable to embodiments of this disclosure.

FIG. 3 shows a schematic structural diagram of an LP-WUR based on a heterodyne architecture with Intermediate Frequency (IF) envelope detection. The receiver architecture in FIG. 3 includes a Matching Network (301), RF BPF (302), RF LNA (303), Mixer (304), LO (305), IF AMP (306), IF BPF (307), IF Envelope Detector (308), BB AMP (309), BB LPF (310), 1-bit or multi-bit ADC (311), and Digital BB Processing (312).

In the architecture shown in FIG. 3, the RF signal is frequency-converted to an IF signal through an RF mixer with an LO. The IF signal is then converted to a baseband signal via IF envelope detection. Depending on the design, there may be one or more IF stages, achieving lower power consumption by relaxing the accuracy and stability requirements of the LO. This architecture may employ a 1-bit or multi-bit ADC. High-Q matching networks and/or RF BPF and/or IF BPF (and/or BB LPF) can be used to suppress adjacent channel interference or interference from legacy NR signals and/or other LP-WUS on adjacent subcarriers. Optionally, this architecture may use certain components to improve sensitivity, such as RF LNA and/or IF AMP and/or BB AMP. Optionally, this architecture can achieve frequency band and/or carrier tuning by adjusting the LO frequency.

FIG. 4 shows a schematic structural diagram of an LP-WUR based on a homodyne or zero-IF architecture with Baseband (BB) envelope detection. The receiver architecture in FIG. 4 includes a Matching Network (401), RF BPF (402), RF LNA (403), Mixer (404), LO (405), BB AMP (406), BB LPF/BPF (407), 1-bit or multi-bit ADC (408), and Digital BB Processing (409).

In the architecture shown in FIG. 4, frequency band and/or carrier tuning can be achieved by adjusting the LO frequency. Using BB BPF/LPF instead of high-Q matching networks and/or RF BPF enables more efficient and simpler suppression of adjacent channel interference or interference from legacy NR signals and/or other LP-WUS on adjacent subcarriers. RF LNA can be applied to improve sensitivity. Baseband envelope detection (not shown in the figure) can be implemented in either the analog domain (before ADC) or the digital domain (after ADC).

The preceding description with reference to FIGS. 2 to 4 introduces multiple LP-WUR architectures. All LP-WUR architectures can support On-Off Keying (OOK) modulation. Some architectures may also be applied to other modulation schemes, such as Frequency-Shift Keying (FSK).

OOK is a well-known modulation method. OOK enables implementation of low-power receivers through envelope/energy detection. OOK represents a special case of Amplitude Shift Keying (ASK), featuring only two amplitude states: ON and OFF. When applied to multi-carrier (MC) systems such as Orthogonal Frequency Division Multiplexing (OFDM), OOK is also referred to as Multi-Carrier OOK, as the ON and OFF signals typically span multiple subcarriers.

In some embodiments, in an OFDM-based MC-OOK system, a network node may utilize coded bits to perform waveform generation for Multi-Carrier Amplitude Shift Keying (MC-ASK), thereby generating a Low-Power Wake-Up Signal (LP-WUS).

The preceding sections have introduced multiple LP-WUR architectures and methods for generating LP-WUS. When a network device transmits LP-WUS, how the LP-WUR in the terminal device receives LP-WUS and performs paging detection are problems that need to be addressed. For example, in the NR paging procedure, the Paging Early Indication (PEI) mechanism and the LP-WUS mechanism are two energy-saving mechanisms for idle/inactive mode. How to combine these two mechanisms for paging is a consideration.

As an example, through the UE Identity (ID), a basic UE group sharing a single Paging Occasion (PO) can be formed in the selection of Paging Frame (PF) and PO. If separate subgroups are configured, the PEI in Release 17 (R17) can indicate which subgroup within the group sharing the same PO is triggered. However, this subgroup design for R17 PEI is not suitable for LP-WUS. This is because the PEI has a longer period and is typically designed to include information for multiple POs. In contrast, LP-WUS can be transmitted more frequently than PEI and PO, meaning multiple LP-WUS may correspond to one PO.

Based on this, the embodiments of this disclosure propose a method for wireless communication. With this method, a terminal device (e.g., UE) can receive a first wake-up signal for waking up a second communication module via a first communication module and perform paging detection via the second communication module. Here, the first occasion for receiving the first wake-up signal is determined based on the waked terminal device group related to the wake-up signal to which the terminal device belongs, while the second occasion for paging detection is determined based on the paging device group or PO group related to paging detection. Thus, this method proposes a new terminal device grouping mechanism suitable for LP-WUS. By performing paging based on joint grouping of LP-WUS and paging messages, the probability of the network device instructing the terminal device to monitor the paging Physical Downlink Control Channel (PDCCH) when no paging is intended can be reduced.

Figure 5:
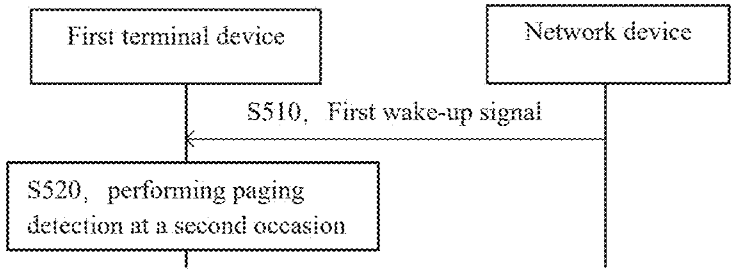
FIG. 5 is a flowchart illustrating a method for wireless communication according to an embodiment of this disclosure.

For ease of understanding, the method proposed in the embodiments of this disclosure will be described in detail below with reference to FIG. 5. FIG. 5 is presented from the perspective of interaction between the first terminal device and the network device.

The first terminal device may be any communication terminal capable of receiving wake-up signals, which is not limited here. In some embodiments, the first terminal device may be in an idle or inactive state. For example, the first terminal device may be a UE in RRC_IDLE or RRC_INACTIVE mode. In some embodiments, the first terminal device may be in a connected state (CONNECTED).

In some embodiments, the first terminal device is a communication terminal in the Internet of Things (IoT). The serving cell of the terminal device may be a Non-Terrestrial Network (NTN) cell or a Terrestrial Network (TN) cell.

The first terminal device may include a first communication module and a second communication module. For example, the first terminal device may include two independent communication modules to save power. Alternatively, the first and second communication modules in the first terminal device may be integrated, but their operational and/or sleep states can be configured separately.

As an example, the first and second communication modules may be in different states. For instance, when the second communication module is in a sleep state, the first communication module may be in an active state searching for wake-up signals.

In some embodiments, the first and second communication modules perform different functions to reduce the power consumption of the first terminal device. The first communication module receives the first wake-up signal for waking up the second communication module, while the second communication module is responsible for paging detection.

As an example, the first communication module is a low-power signal reception module, and the second communication module is the main communication module of the first terminal device. For instance, the first communication module may be an LP-WUR or belongs to an LP-WUR, while the second communication module belongs to the Main Radio (MR).

As an example, the first communication module may adopt any of the receiver architectures described earlier, such as any of those shown in FIGS. 2 to 4.

In some embodiments, the first terminal device may include the aforementioned LP-WUR or a functionally similar module to monitor LP-WUS.

In some embodiments, the first terminal device may belong to one of multiple terminal device groups or subgroups, which will be discussed later in conjunction with FIGS. 6 to 9.

The network device may provide services for the cell where the terminal device is located. The network device may be any of the network devices described earlier, which is not limited here. For example, the network device may be any of the base stations mentioned earlier.

In some embodiments, the network device may be a communication device supporting LP-WUS functionality. For example, the network device may periodically transmit LP-WUS to facilitate waking up terminal devices. Alternatively, the network device may implement energy-saving configurations associating LP-WUS with POs.

As an example, the cell served by the network device is an NTN cell. For instance, the network device may be a satellite covering the area where the terminal device is located in the NTN, or it may be a ground gateway or terrestrial network device communicating with the satellite in the NTN.

In some embodiments, terminal devices and network devices are relative terms. For example, a relay device may be referred to as a terminal device relative to the network device. As an example, a relay device may be referred to as a network device relative to the terminal device.

Referring to FIG. 5, in step S510, the first terminal device receives the first wake-up signal transmitted by the network device. The first wake-up signal may be the aforementioned LP-WUS or a signal with similar functionality to LP-WUS.

The first terminal device receives the first wake-up signal via the first communication module, meaning the first communication module is in an active state.

The first wake-up signal is the wake-up signal corresponding to the first terminal device, i.e., the first wake-up signal may indicate whether the first terminal device or part of modules of the first terminal device should be awakened. Awakening the first terminal device or part of modules of the first terminal device may refer to transitioning the communication module from a sleep state to an active state or triggering the communication module to perform paging detection (or monitoring).

The first wake-up signal is configured to wake up the second communication module in the first terminal device. It should be understood that since the first communication module can operate independently of the first terminal device, waking up the second communication module can also be referred to as waking up the first terminal device. Before receiving the first wake-up signal, the second communication module is in a sleep state. The first terminal device may determine whether to wake up the second communication module based on the first wake-up signal. In some embodiments, the first wake-up signal may also be configured to wake up other modules in the first terminal device besides the second communication module.

In some embodiments, the first wake-up signal is configured to carry first information, meaning the first wake-up signal includes the first information. For example, the first information may include the ID of the first terminal device to indicate the intended user for the wake-up signal. Alternatively, the first information may include an indication of whether the second communication module should be awakened. Additionally, the first information may include related information supporting other functions.

As an example, the ID of the first terminal device may be the ID of the device itself, the ID of the terminal device group to which it belongs, or the ID of the terminal device subgroup to which it belongs. In the embodiments of this disclosure, the ID of the first terminal device may also be referred to as the ID corresponding to the first terminal device to distinguish the ID corresponding to the first terminal device from the ID of the device itself.

As an example, an indication of whether the second communication module is awakened includes whether to trigger the second communication module to perform paging detection.

As an example, other functions may include System Information (SI) changes, Earthquake and Tsunami Warning System (ETWS), or Commercial Mobile Alert Service (CMAS).

As an example, a payload of LP-WUS may include an indication of the subgroup of the terminal device group which is the same with the PEI subgroup or PO group. This subgroup indication may use up to 3 bits (when indicating an index) or 8 bits (when representing an index bitmap). Additionally, orthogonal terminal device subgroups may be introduced, which can utilize different occasions to receive wake-up signals.

In some embodiments, the maximum number of information bits carried by LP-WUS is limited. As mentioned earlier, LP-WUS supports a bandwidth of 5-20 MHz. Furthermore, the spectral efficiency supported by LP-WUS cannot match that of paging PDCCH or PEI scenarios. Compared to PDCCH-based signals, the spectral efficiency limits the maximum number of information bits that LP-WUS can carry, thereby also limiting the maximum number of terminal device subgroups that LP-WUS can indicate. For example, the maximum number of terminal device subgroups associated with a given LP-WUS reception occasion may be 8.

As an example, the maximum number of bits for the first information is X bits, where X does not exceed 8 bits or 16 bits.

As an example, the maximum number of device subgroups of the PO associated with the first terminal device is related to the maximum number of bits of the first information. In other words, the maximum number of bits of the first information may be determined based on the maximum number of device subgroups corresponding to the PO associated with the first terminal device. Here, the maximum number of bits of the first information may be replaced with the maximum number of information bits of the first wake-up signal. The PO associated with the first terminal device may be replaced with one or more POs corresponding to the first terminal device.

As an example, the maximum number of device subgroups of the PO associated with the first terminal device may be indicated by PEI.

Taking the first PO as an example, when the first PO is associated with multiple device subgroups, all terminal devices in the multiple device subgroups will perform paging detection on the first PO. The maximum number of the multiple device subgroups is the maximum number of device subgroups corresponding to the first PO.

For example, LP-WUS may use a bitmap or codepoint to represent information about one or more device subgroups among N device subgroups. As a possible implementation, the maximum number (Y) of device subgroups per PO and the maximum number (Z) of information bits per LP-WUS may be configured via higher layer or indicated by PEI.

As an example, Y may support integer values such as 8, 16, 32, 64, or 128.

As an example, Y and Z may have a one-to-one correspondence. Examples of the relationship between Y and Z include:

$$\text{Option 1: } Y = 8, Z = 3;$$

$$\text{Option 2: } Y = 16, Z = 4;$$

$$\text{Option 3: } Y = 32, Z = 5;$$

$$\text{Option 4: } Y = 64, Z = 6 \text{ or } 7;$$

$$\text{Option 5: } Y = 256, Z = 8.$$

Taking LP-WUS as an example, for RRC_IDLE/RRC_INACTIVE mode, the information carried by LP-WUS may include: Identifier (UE group ID or UE subgroup ID); Indication of whether to trigger paging monitoring; if the payload size permits, providing additional information to support other functions.

Still taking LP-WUS as an example, for a connected mode, the information carried by LP-WUS may include: user-specific information for LP-WUS; indication to wake up PDCCH monitoring.

In some embodiments, the first information may be carried in various ways, which will be discussed later in conjunction with bitmaps and multiple encoding methods.

The first terminal device may receive the first wake-up signal at the first occasion. The network device may transmit the first wake-up signal at the first occasion or the time-domain position corresponding to the first occasion. The time-domain position corresponding to the first occasion is mainly for scenarios with long communication delays. The first occasion may be one of multiple occasions for receiving/detecting LP-WUS, so the first occasion may also be referred to as the first LP-WUS Occasion (LO). For example, the first occasion is an occasion among multiple occasions for the first terminal device to detect LP-WUS.

In some embodiments, the first occasion may be one LO or multiple LOs. For example, within one LO cycle, one or more LOs may be configured for the first terminal device to detect the first wake-up signal. Alternatively, within each LO cycle, each LP-WUS may correspond to one LO or support multiple LOs.

As an example, the first occasion may be a dedicated LO for the first terminal device or a common LO. When the first occasion is a common LO, after receiving the wake-up signal on the common LO, the first communication module does not immediately wake up the second communication module but continues to detect the first wake-up signal and/or PEI corresponding to the first terminal device. Upon detecting the first wake-up signal or the corresponding PEI, the first communication module wakes up the second communication module.

The multiple occasions including the first occasion may be configured in various ways for the first terminal device to determine. In some embodiments, the first occasion may be configured based on the allocation of multiple POs. For example, multiple LOs including the first occasion may be allocated based on the positions of POs and configured offsets. In some embodiments, the first occasion may be configured for one or more LOs in a specified manner.

In some embodiments, the first occasion is determined based on the index of the PO associated with the first terminal device. In other words, the first terminal device may determine the first occasion among multiple occasions based on the index of the associated PO. For example, the index of the first occasion is determined based on the index of the PO associated with the first terminal device. When the first occasion is the first LO among multiple LOs, the first terminal device may determine the index of the first LO for receiving the first wake-up signal among the multiple LOs based on the index of the PO associated with the first terminal device.

As an example, the index of the first occasion may be the index among all occasions within one cycle or the index among all occasions within a specified number of cycles.

As an example, the network device may configure the periodicity of LOs and the number of LOs within one LO cycle, and the first terminal device may determine the LO index based on the PO index of the first device. For instance, after the gNB configures the periodicity of LOs and the number of LOs within one LO cycle, the index $i_{LO}$ of the first LO associated with the first terminal device in one LO cycle may be:

$$i_{LO} = [(\text{UE\_IDmodN}) * Ns + \text{i\_s}]\text{mod}N_{LO};$$

where UE_ID is the ID of the first terminal device, $N_{LO}$ is the number of LOs in one LO cycle, i_s is the PO index corresponding to the first terminal device, and N and Ns are paging-related parameters broadcast by the gNB (refer to the formula for calculating the PO index specified in TS 38.304).

In the above example, the gNB does not need to configure the relationship between the offset and different POs but only needs to configure the number $N_{LO}$. Assuming the LO cycle equals the DRX (i-DRX) cycle in an idle mode, if $N_{LO}$ equals the number of POs in one i-DRX cycle, it indicates a one-to-one mapping between LOs and POs. If $N_{LO}$ is half the number of POs in one i-DRX cycle, it implies a one-to-two mapping between LOs and POs.

In some embodiments, the first occasion is one of multiple occasions, and these occasions (LOs) are configured based on POs. In other words, the multiple LOs including the first occasion are associated with multiple POs. One LO may map to one or more POs. When detecting the identifier of the PO in the configured first occasion (LO), the first terminal device need monitor at least the associated PO based on the mapping. This ensures that the first terminal device can receive paging messages in specific POs according to the intent of the network device. Thus, through the association between LOs and POs, the terminal device need monitor at least the PO related to the LP-WUS occasion, where LP-WUS is the signal for indicating waking up received by the terminal device. For the LP-WUS monitoring procedure, determining the position of the PO to monitor based on the received LO is critical.

As an example, POs and LOs may have a one-to-one correspondence, one LO may correspond to multiple POs, or multiple LOs may correspond to one PO.

As an example, LOs are allocated based on the positions of POs and configured offsets, allowing terminal devices to monitor POs by receiving LOs.

As an example, multiple occasions are used for terminal devices to receive LP-WUS, so the cycle of the multiple occasions may also be referred to as the cycle of LP-WUS.

As an example, multiple occasions have a one-to-one correspondence with multiple POs, and the cycle of these occasions is the same as the Discontinuous Reception (DRX) cycle. In other words, one LO is associated with one PO, and the LO cycle may be the same as the DRX cycle.

It should be understood that, from the perspective of the terminal device, when the LO cycle can be configured separately from the DRX cycle, multiple LOs may map to a single PO, allowing more frequent LP-WUS monitoring opportunities. Furthermore, maintaining the same DRX cycle enables the terminal device to receive LP-WUS more frequently without shortening the DRX cycle.

In some embodiments, the multiple occasions including the first occasion are configured in a specified manner. This means the terminal device can periodically monitor LP-WUS based on designated positions in a duty-cycled manner. Duty-cycled monitoring may lead to a high collision probability, where LOs may not have sufficient resources to transmit the required number of LP-WUS. To address this, it is not necessary to enforce a one-to-one mapping between LOs and POs. Therefore, configuring LOs independently of POs is also an optional solution. As an example, the multiple occasions including the first occasion may be determined based on the positions of synchronization signals. For instance, the network device or standard may define LO configurations similar to configurations for POs. Alternatively, when the first occasion corresponds to a first reference synchronization signal, the time-domain position of the first occasion may be determined based on the time-domain position of the first reference synchronization signal, which could be the starting or ending position.

Optionally, the first reference synchronization signal may be a reference Synchronization Signal Block (SSB) or Synchronization Signal and Physical Broadcast Channel Block (SSB).

Optionally, the first reference synchronization signal may also be a Low-Power Synchronization Signal (LP-SS).

As an example, the first occasion for the first terminal device to detect LP-WUS may be determined by the following formula:

$$(X + LO_{offset})\text{mod}T_{LO} = (\text{UE\_IDmodN}_{LO}) * \left(\frac{T_{LO}}{N_{LO}}\right);$$

where X represents an offset of the first reference synchronization signal, $LO_{offset}$ denotes an offset of the first occasion, $T_{LO}$ indicates a first cycle corresponding to the first occasion, UE_ID is the ID corresponding to the first terminal device, $N_{LO}$ signifies the number of occasions within the first cycle.

Optionally, the first period may be the LO cycle. As mentioned earlier, the LO cycle can be the same as the DRX cycle or configured separately.

Optionally, the number of occasions within the first cycle may refer to the number of LOs per LO cycle or the number of LOs within the current LO cycle.

Optionally, the offset of the first occasion represents the offset of the first occasion relative to the reference signal and can be configured by the network device. For example, the reference SSB/LP-SS in each i-DRX cycle or LO cycle may also be configured by the gNB. $LO_{offset}$ is the LO offset for the first terminal device and can be determined based on the ID of the first terminal device, the ID of the group to which the first terminal device belongs, or the ID of the subgroup to which the first terminal device belongs.

It should be understood that if public LOs are supported for transmitting public information, the method for determining the first occasion can be modified accordingly.

Figure 6:
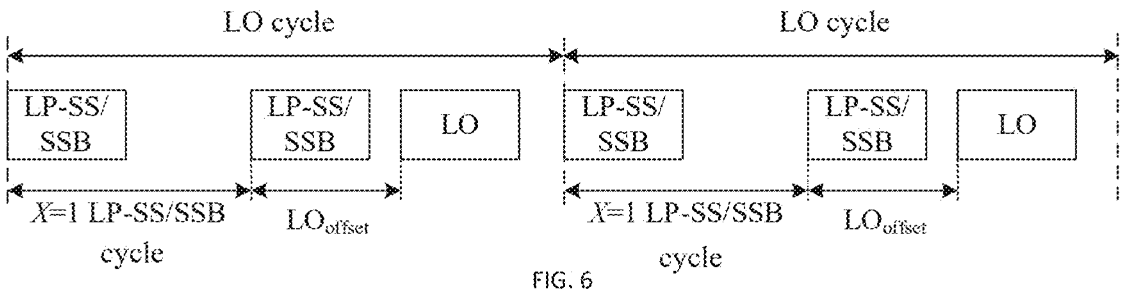
FIG. 6 is a schematic diagram of a possible implementation of the method shown in FIG. 5.

For easy understanding, FIG. 6 provides an illustrative explanation of the formula for determining the first occasion. FIG. 6 shows two LO cycles, each containing two LP-SS/SSBs and one LO (i.e., the first occasion). Thus, multiple LOs, including the first occasion, can be periodically configured based on the LO cycle. As shown in any LO cycle in FIG. 6, the second LP-SS/SSB serves as the first reference synchronization signal, so the offset of the first reference synchronization signal is one LP-SS/SSB cycle. The time-domain position of the first occasion is a sum of the time-domain position of the first reference synchronization signal and the offset of the first reference synchronization signal, i.e., $X+LO_{offset}$.

The preceding discussion with FIG. 6 describes a configuration method for the first occasion. Here, the ID of the first terminal device may be the ID of the group to which the first terminal device belongs, or the ID of the subgroup to which the first terminal device belongs. Therefore, the first occasion corresponding to the first terminal device can be determined based on the group to which the first terminal device belongs or the subgroup to which the first terminal device belongs. Note that, barring conflicts, the terms "group" and "subgroup" for the first terminal device may be used interchangeably.

Since the first occasion is used for the first terminal device to receive the first wake-up signal, the terminal device group determining the first occasion is referred to as the first waked terminal device group (or wake-up group). Thus, the first waked terminal device group is divided based on wake-up signals. All terminal devices in the first waked terminal device group share the same wake-up signal reception occasion, i.e., the first occasion.

In some embodiments, the first terminal device is one of multiple terminal devices. When the multiple terminal devices are divided into multiple waked terminal device groups including the first waked terminal device group, a division of the multiple waked terminal device groups is based on one or more of the following: wake-up latency of the terminal devices; IDs of the terminal devices; the number of different types of waked terminal device groups among the multiple waked terminal device groups.

As an example, the wake-up latency of the terminal device, also referred to as wake-up duration, is used to determine the wake-up time. This wake-up latency also represents a wake-up duration of the second communication module in the terminal device. By assigning terminal devices with different wake-up latencies to different waked terminal device groups or subgroups, more efficient handling of terminal devices with varying wake-up requirements can be achieved while minimizing an impact on false alarm rates.

As an example, the wake-up latency of the terminal device may include the minimum wake-up latency of the terminal device. The wake-up latency of the terminal device may consist of multiple parameters, with the shortest duration being the minimum wake-up latency. The network device may group terminal devices based on the minimum wake-up latency of all terminal devices, or the network device may use the maximum wake-up latency or an average wake-up latency of all terminal devices for grouping the terminal devices.

It should be understood that different terminal devices may have different wake-up latencies due to factors such as hardware characteristics, power optimization strategies, network conditions, and design objectives of the terminal devices themselves. For example, processors in different terminal devices may operate at different speeds, leading to variations in wake-up latency—high-performance processors may enter the active state faster than low-performance processors. For example, the speed of memory and storage also affects wake-up latency—faster memory can accelerate recovery from low-power states. For example, some terminal devices may adopt stricter battery management strategies to extend battery life, potentially resulting in longer wake-up latencies. For example, different terminal devices may support varying levels of low-power modes, with deeper sleep modes (e.g., longer hibernation periods) requiring more time to wake up. For example, base stations (eNB or gNB) may configure different wake-up times and DRX cycles for terminal devices based on network load and coverage. In areas with weaker signals, terminal devices may need more time for signal synchronization and recovery, leading to longer wake-up latencies.

As one implementation, the network device may receive wake-up latency reports from terminal devices to perform grouping. The network device can define multiple ranges for wake-up latency, and terminal devices may determine to which waked terminal device group the terminal devices belongs to based on which range the wake-up latency falls into.

As an example, the IDs of the terminal devices may be combined with the wake-up latencies of the terminal devices to facilitate grouping for devices without latency reports. For instance, wake-up device subgroups formed based on reported latencies may occupy a portion of the total wake-up device subgroups, while the remaining subgroups are used to group other terminal devices. For example, if the total number of wake-up subgroups is configured as 16, and 4 subgroups are allocated for terminal devices with longer wake-up latencies, the remaining 12 subgroups may be used to group terminal devices based on the IDs of the terminal devices. For example, among terminal devices that have reported wake-up latencies, those with longer latencies may be assigned to dedicated subgroups, while terminal devices with shorter latencies are grouped together with other devices. In these examples, the number of subgroups for any type can be configured independently.

As an example, the multiple waked terminal device groups may be categorized into different types of waked terminal device groups. These types may include groups dedicated to terminal devices with longer wake-up latencies, as well as groups for terminal devices without latency reports.

As an example, the multiple waked terminal device groups may be divided based on various types of information among the aforementioned information. For instance, the network device may assign terminal devices with reported wake-up latencies exceeding a specific threshold to separate waked terminal device groups. The number of such groups can be configured independently by the network, allowing flexibility in network design and optimization.

In some embodiments, considering characteristics of OOK LP-WUR architecture, the spectral efficiency of LP-WUS is significantly lower than that of PDCCH. The network device may configure multiple Wake-up Signal (WUS) Monitoring Occasions (MOs) for different LOs associated with distinct waked terminal device groups. As one implementation, PEI and/or PO may be associated with MOs rather than having PO directly linked to LO.

Alternatively, multiple WUS Monitoring Occasions (MOs) can be configured for different WUS transmission occasions (LOs) associated with various UE subgroups. This allows PEI and/or PO to be associated with MOs instead of associating PO with LO.

Continuing with FIG. 5, in step S520, the first terminal device performs paging detection at the second occasion. The first terminal device may execute this paging detection through the second communication module. For instance, the awakened second communication module is utilized for paging detection at the second occasion. Correspondingly, the network device may transmit paging information corresponding to the first terminal device at the second occasion or the time-domain position corresponding to the second occasion. The time-domain position corresponding to the second occasion similarly addresses scenarios with long communication delays. This paging information may include paging messages and/or PEI corresponding to the first terminal device.

The paging detection performed by the first terminal device may involve either direct detection of paging messages at PO, or detection of PEI that indicates PO. Thus, the second occasion could be a PO for detecting paging messages, or an occasion for detecting PEI. Illustratively, when LP-WUS is used in conjunction with PEI, the second occasion may be designated for PEI detection. Illustratively, when LP-WUS is used with PEI, the second occasion may alternatively be used for paging message detection. Illustratively, when the communication system doesn't employ the PEI mechanism, the second occasion is used for paging message detection.

In some embodiments where the second occasion is used for paging message detection, the second occasion represents one of multiple POs corresponding to the first terminal device. The first terminal device may determine the PO position based on the wake-up latency of the second communication module. In this case, the nearest PO following the wake-up time is selected for monitoring. Notably, terminal devices monitoring the same LO may determine different POs for paging detection based on the determined wake-up times. Further, this approach facilitates more accurate positioning for POs by supporting terminal devices with varying wake-up latencies.

As an implementation, the time-domain positions of multiple POs corresponding to the first terminal device may be determined according to the wake-up latency of the first terminal device. The first terminal device can monitor for paging messages at calculated POs while awaiting reception of paging messages.

The time-domain position of any PO among multiple POs may be determined based on: the wake-up latency of the first terminal device, and the time-domain position of the previous PO. The time-domain position of the previous PO may be determined Based on either records from the first terminal device, or system parameters.

As an example, the wake-up latency remains constant during each paging detection by the first terminal device.

As an example, the wake-up latency may vary during each paging detection by the first terminal device. To effectively support terminal devices with dynamic wake-up latencies in monitoring POs for paging messages, the time-domain position of the next PO must account for wake-up latency variations.

As one implementation, multiple POs may include the second occasion $T_{po}$ for current paging detection, and a third occasion $T_{next\_po}$ for next paging detection. The time-domain position of the third occasion $T_{next\_po}$ can be expressed as:

$$T_{next\_po} = T_{wakeup} + (T_{po} - (T_{wakeup} \bmod T_{po}));$$

where $T_{wakeup}$ represents the wake-up latency for the next paging detection by the first terminal device.

Optionally, when the first terminal device maintains the same wake-up latency, $T_{wakeup}$ remains unchanged. The first terminal device may record $T_{wakeup}$ upon initially receiving the wake-up signal, and subsequently calculate the time-domain position of the next nearest PO.

Optionally, when the first terminal device has variable wake-up latencies, the first terminal device may calculate an adjusted wake-up latency based on both the current wake-up latency $$T'_{wakeup},$$

and the wake-up latency difference $\Delta t_{wakeup}$. For example, $$T_{wakeup} = T'_{wakeup} + \Delta t_{wakeup}.$$

By calculating the adjusted wake-up latency and dynamically adapting the PO monitoring time according to different wake-up latency, this mechanism ensures each terminal device monitors POs at an optimal timing of each terminal device. This approach achieves dual benefits: efficiently handling paging requests while optimizing the power consumption of terminal devices.

In some embodiments, it may be beneficial for the first terminal device to monitor other POs other than associated PO of the first terminal device. For example, if the paging load is high, monitoring multiple POs may be advantageous. For another example, monitoring other POs can prevent missed detection of required POs.

As an implementation, the network device may configure a paging detection window for the first terminal device. Within this window, the first terminal device may monitor additional POs for a specified duration after detecting the LO. That is to say, the device can perform paging detection at a fourth occasion within the first time window. The fourth occasion may correspond to a PO unrelated to the first terminal device.

Optionally, the first time window may be based on the LP-WUS reception window, characterized in that: the first terminal device only monitors existing POs within this window; the device transitions to a sleep state upon window expiration.

Optionally, a length of the first time window may be determined by one or more of: the number of upcoming paging for the first terminal device; slots/frame counts configured in System Information Blocks (SIBs); cell load conditions; terminal device coverage area.

Optionally, the network device may determine the specific duration for monitoring additional POs and the quantity of additional POs to monitor based on configuration parameters and terminal device capabilities.

In some embodiments, the second occasion may be determined based on the first waked terminal device group. After determining the waked terminal device group to which it belongs, the first terminal device may directly determine the second occasion for paging detection according to the association relationship between the LO and the PO or PO group.

In some embodiments, the second occasion may be determined based on the first paging device group to which the first terminal device belongs or the first PO group corresponding to the first terminal device. For example, the first terminal device may determine the first occasion based on the first waked terminal device group to which the first terminal device belongs, and then determine the second occasion based on the first paging device group to which the first terminal device belongs or the first PO group corresponding to the first terminal device.

As an example, the first PO group may be the group to which the PO corresponding to the first terminal device belongs. The first PO group is one of multiple PO groups. The multiple PO groups may be grouped based on the time-domain locations of multiple POs or the configuration of the network device. For instance, multiple POs located within one LO cycle belong to one PO group. Alternatively, multiple POs located in different LO cycles belong to one PO group. Alternatively, the network device may directly configure multiple POs corresponding to a certain terminal device group as one PO group.

In some embodiments, the second occasion may be determined based on the first waked terminal device group and the first paging device group or the first PO group to which the first terminal device belongs, to achieve finer sub-grouping granularity for PEI/PO or to divide terminal devices into sub-groups with different terminal device sets. The paging device group may also be referred to as a paging group. Through finer grouping, the network device can more precisely instruct terminal devices to perform paging detection, thereby reducing the probability of monitoring paging PDCCH when no paging occurs.

All terminal devices in the first paging device group are associated with the same PEI and/or PO. In other words, the first paging device group is divided based on the paging configuration of the terminal devices. When all terminal devices in the first paging device group are associated with the same PEI, the division method of the first paging device group may, for example, follow the PEI sub-group division method in NR. When all terminal devices in the first paging device group are associated with the same PO, the division method may be based on the configuration of the PO.

As an example, "all terminal devices are associated with the same PO" may also be replaced with "all terminal devices are associated with the same PO group." The multiple POs in this PO group may be consecutive or periodically configured. All terminal devices in the first paging device group will perform paging detection on all POs in this PO group.

As an example, when the second occasion is determined based on the first waked terminal device group and the first PO group, the first terminal device may first determine the LO (first occasion) based on the first waked terminal device group to which the first terminal device belongs, and then determine one or more POs for paging detection within the cycle of this LO based on the first PO group.

In some embodiments, the terminal devices in the first waked terminal device group partially overlap with those in the first paging device group or the first PO group. That is, the division of the first waked terminal device group and the first paging device group or the first PO group is independent of each other. For example, the first waked terminal device group and the first paging device group are determined based on different factors. For example, the first waked terminal device group and the first PO group corresponding to the first terminal device are different types of groupings.

Taking PEI-based grouping as an example, the multiple waked terminal device groups to which the first waked terminal device group belongs and the multiple paging device groups to which the first paging device group belongs may be divided differently based on LP-WUS and PEI, respectively. The multiple waked terminal device groups may also be referred to as LP-WUS grouping, and the multiple paging device groups may also be referred to as PEI grouping. For easy understanding, the following uses UE1 to UE9 as an example to illustrate grouping based on LP-WUS and PEI.

Referring to an example in Table 1, the terminal device grouping based on the PEI of the RAN is P1, P2, P3, and the grouping based on LP-WUS is L1, L2, L3. P1, P2, P3 are multiple paging device groups including the first paging device group, and L1, L2, L3 are multiple waked terminal device groups including the first waked terminal device group. The joint grouping of terminal devices through LP-WUS and PEI improves the grouping granularity by nearly twofold. When the terminal device supports monitoring PEI after receiving the wake-up indication from LP-WUS, the grouping granularity of terminal devices can be enhanced. In other words, each LO corresponds to different waked terminal device groups, and different waked terminal device groups monitor different LP-WUS occasions (LOs).

TABLE 1

| | | PEI grouping | | |
|---|---|---|---|---|
| | | P1 | P2 | P3 |
| LP-WUS grouping | L1 | UE1 | UE2 | UE3 |
| | L2 | UE4 | UE5 | UE6 |
| | L3 | UE7 | UE8 | UE9 |

As shown in Table 1, UE1 to UE9 can be divided into six different subgroups:

$$P1 = \{UE1, UE4, UE7\}; P2 = \{UE2, UE5, UE8\}; P3 = \{UE3, UE6, UE9\};$$

$$L1 = \{UE1, UE2, UE3\}; L2 = \{UE4, UE5, UE6\}; L3 = \{UE7, UE8, UE9\}.$$

In some embodiments, the terminal devices in the first waked terminal device group may completely overlap with those in the first paging device group. For example, the same grouping may be applied to both LP-WUS and PEI, as illustrated in Table 2. In other words, the LP-WUS groups L1, L2, L3 are determined based on the PEI groups P1, P2, P3 of the RAN. When the same grouping is used, power-saving efficiency is further improved. Through joint grouping between LP-WUS and PEI, terminal devices can monitor the PEI group after receiving the wake-up indication from the LP-WUS group.

TABLE 2

| | | | | |
|---|---|---|---|---|
| LP-WUS grouping/ PEI grouping | L1/P1 | UE1 | UE2 | UE3 |
| | L2/P2 | UE4 | UE5 | UE6 |
| | L3/P3 | UE7 | UE8 | UE9 |

It should be understood that the PEI-based grouping in Table 1 and Table 2 can also be replaced with PO-based grouping. For example, when the system does not employ PEI, the first paging device group to which the first terminal device belongs may be determined based on related information of the PO associated with the first terminal device.

Figure 7:
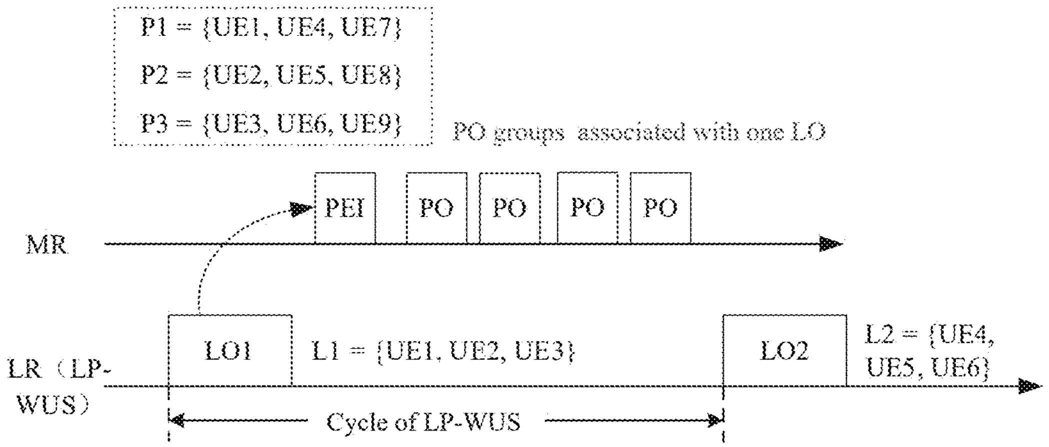
FIG. 7 is a schematic diagram of another possible implementation of the method shown in FIG. 5.
Figure 8:
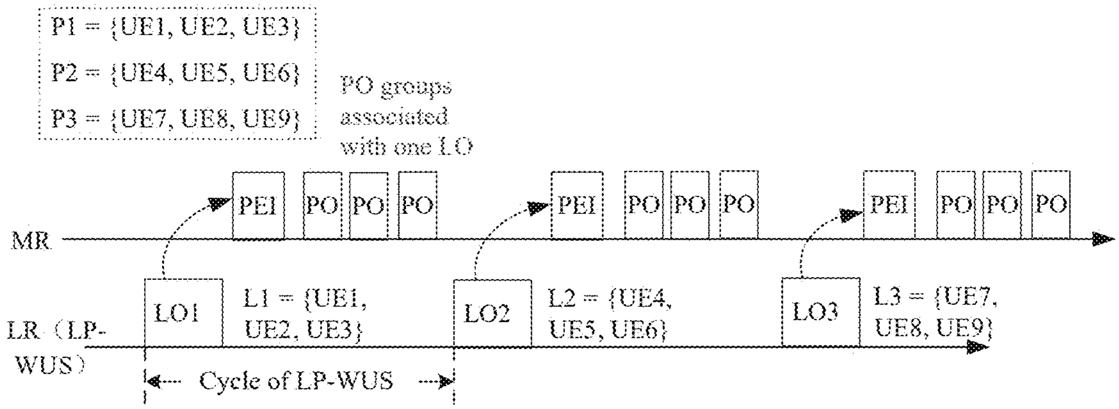
FIG. 8 is a schematic diagram of yet another possible implementation of the method shown in FIG. 5.
Figure 9:
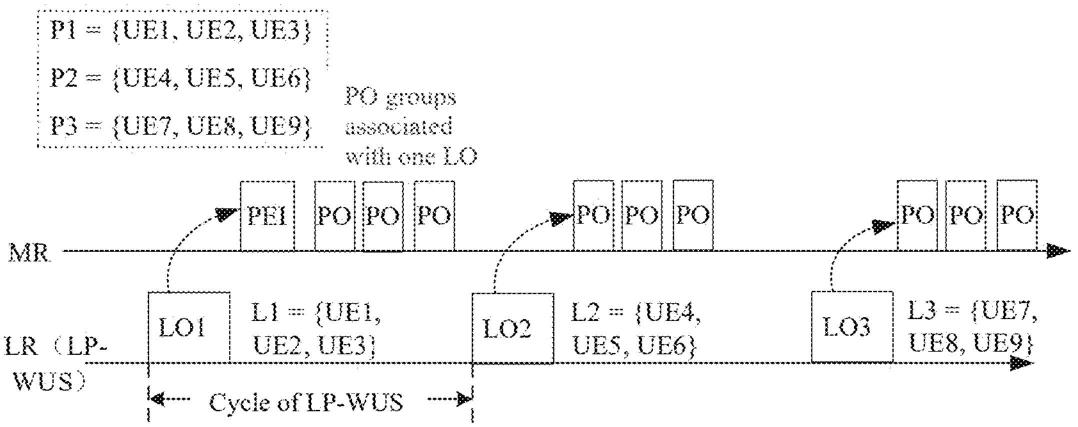
FIG. 9 is a schematic diagram of still another possible implementation of the method shown in FIG. 5.

The above text introduces various splitting methods for joint grouping based on LP-WUS and PEI, combining Table 1 and Table 2. Joint paging based on LP-WUS and PEI is beneficial for further reducing the probability of the network indicating terminal devices to monitor paging PDCCH when not paged. Below, the method for terminal devices to perform paging detection based on the joint grouping is exemplarily explained with reference to FIGS. 7 to 9. In FIGS. 7 to 9, each LP-WUS supports one LO. The PO group associated with one LO can be the POs within the cycle where the LO is located. Here, the first terminal device is UE1, and the first occasion corresponding to the first wake-up signal is LO1. The first communication module in the first terminal device is LR, configured to receive LP-WUS; the second communication module is MR, configured to detect PEI and/or detect paging messages on POs. In FIG. 7, the grouping based on LP-WUS differs from that based on PEI, while in FIGS. 8 and 9, the grouping based on LP-WUS is the same as that based on PEI.

Referring to FIG. 7, LO1 is only used for terminal devices in the L1 group to monitor LP-WUS. Other terminal devices, even if paged, need wait for LO2 or other LO group occasions to monitor WUS based on the grouping of other terminal devices, thereby increasing the probability of PEI monitoring. For example, UE4, UE5, and UE6 can monitor WUS at LO2, while UE7, UE8, and UE9 must wait for LO3. In the case of separate LO grouping and PEI grouping, the overlap of the two groupings enables more precise detection indications.

As shown in FIG. 7, terminal devices UE1, UE2, and UE3 in the L1 group can all receive PEI within the cycle of LO1 and determine subsequent indicated POs. Further, UE1 can detect paging messages at the first PO after PEI based on the P1 group to which UE1 belongs, UE2 can detect paging messages at the second PO after PEI based on the P2 group to which UE2 belongs, and the like.

Referring to FIG. 8, when LO grouping and PEI/PO grouping are separate but identical, only users belonging to a specific terminal device group are given more precise indications. As shown in FIG. 8, terminal devices UE1, UE2, and UE3 in the L1/P1 group can all receive PEI within the cycle of LO1 and determine the subsequent indicated POs. Other terminal device groups can continue detecting PEI or paging messages in subsequent LO cycles. For example, if one LP-WUS corresponds to multiple LOs or multiple MOs, the remaining LOs or MOs within this cycle can be used to receive paging indications, meaning PEI and MO can correspond one to one.

As shown in FIG. 8, terminal devices UE1, UE2, and UE3 in the L1 group can detect paging messages at the first PO after PEI within the LO1 cycle based on the P1 group of terminal devices UE1, UE2, and UE3. Terminal devices UE4, UE5, and UE6 in the L2 group can detect paging messages at the second PO after PEI within the LO2 cycle based on the P2 group of terminal devices UE4, UE5, and UE6, and the like.

Comparing FIGS. 8 and 9, it can be seen that in FIG. 9, PEI only appears within the cycle of LO1, and the subsequent consecutive cycles only have POs (no PEI). In scenarios where PEI remains unchanged or a change time of the PEI exceeds the LO cycle, the paging device group subsequently indicated by PEI or the PO group associated with the first LO can be received in the first LO cycle. Other paging device groups or PO groups associated with other LOs can detect POs in subsequent LO occasions without needing to read PEI information.

As one implementation in FIG. 9, since the grouping of the waked terminal device group and the grouping of the paging device group are the same, terminal devices can determine the paging device group after determining the waked terminal device group to which the terminal devices belongs to, thereby determining the PO for paging detection. As shown in FIG. 9, terminal devices UE4, UE5, and UE6 in the L2 group, after receiving the wake-up signal at LO2, do not need to read PEI information. These terminal devices can determine they belong to the P2 group based on the L2 group and thus detect paging messages at the second PO within the LO2 cycle, and the like.

The above text, with reference to FIGS. 5 to 9, introduces a method for more refined indications for paging detection based on joint grouping. In this method, joint grouping based on LP-WUS and PEI can reduce a false detection rate of paging messages by terminal devices while achieving energy savings. As seen in FIG. 9, in scenarios using the PEI mechanism, terminal devices do not necessarily need to detect PEI after receiving LP-WUS. In the embodiments of this disclosure, the first terminal device can determine whether to monitor PEI based on various conditions.

In some embodiments, the first terminal device can determine whether to monitor the PEI corresponding to the first terminal device based on the wake-up delay of the second communication module. Here, the PEI corresponding to the first terminal device corresponds to one or more reception occasions (i.e., LOs) of the first wake-up signal. For example, if the wake-up delay of the second communication module is long, the PEI arrives before wake-up and may not be monitored.

As an example, after receiving the first wake-up signal at the first occasion, the first terminal device can determine whether to wake up the second communication module based on the wake-up delay of the second communication module. In some scenarios, waking up the second communication module can replace monitoring the PEI corresponding to the first terminal device. In other scenarios, waking up the second communication module can replace monitoring the paging messages corresponding to the first terminal device on POs.

As an example, the time interval between LO (first occasion) and MR (second communication module) wake-up can be used to control whether the terminal device is allowed to monitor PEI. If the first terminal device needs to monitor PEI after receiving an LP-WUS indicating waking up, this time interval should not be less than the minimum interval for the first terminal device to wake up MR. In other words, if the time interval between LO and PEI is not greater than the minimum wake-up delay in a capability report of the first terminal device, the PEI may not be monitored after receiving the LP-WUS indicating waking up.

As an example, the first occasion can be the first reception occasion of the LP-WUS by the first terminal device. When the time interval between the first occasion and the PEI corresponding to the first terminal device is greater than the minimum wake-up delay of the second communication module, the first terminal device monitors the PEI. Alternatively, when the time interval between the first occasion and the PEI corresponding to the first terminal device is less than or equal to the minimum wake-up delay, the first terminal device does not monitor the PEI.

In some embodiments, the first terminal device can determine whether to monitor the PEI corresponding to the first terminal device based on the position of the first occasion among multiple occasions. As shown in FIG. 9, when the first waked terminal device group is one of multiple waked terminal device groups (L1 to L3), the plurality of waked terminal device groups correspond to a plurality of occasions. After receiving the first wake-up signal at the first occasion, the first terminal device can determine whether to monitor the PEI corresponding to the first terminal device based on the position of the first occasion among the multiple occasions. For example, if the first occasion is LO1 in FIG. 9, the first terminal device needs to monitor PEI; if the first occasion is LO2 or LO3 in FIG. 9, the first terminal device does not need to monitor PEI.

As an example, when the first occasion is the first occasion among multiple occasions, the first terminal device monitors the PEI corresponding to the first terminal device. Alternatively, when the first occasion is any occasion other than the first occasion among multiple occasions, the first terminal device does not monitor the PEI corresponding to the first terminal device.

In some embodiments, the first terminal device monitoring the PEI corresponding to the first terminal device can be replaced by the second communication module monitoring the PEI corresponding to the first terminal device. In other words, when PEI monitoring is required, the second communication module has already been awakened.

In some embodiments, the first terminal device monitoring the PEI corresponding to the first terminal device can be replaced by the first communication module monitoring the PEI corresponding to the first terminal device. In other words, when PEI monitoring is required, the second communication module does not need to be awakened yet. The second communication module is only awakened when PO monitoring is needed.

The above text mentions that the network device groups terminal devices based on the wake-up delay reports of the terminal devices. This indicates that the first terminal device needs to report the wake-up delay information to the network device so that the network device can determine the waked terminal device group of the first terminal device based on the wake-up delay. In other words, the network device can use the wake-up delay information reported by multiple terminal devices to effectively group the first terminal device.

In some embodiments, the first terminal device can report the wake-up delay information to the network device through capability reporting. For example, the first terminal device can transmit the capability information to the network device. The reported capability information can indicate the minimum wake-up delay of the second communication module. The minimum wake-up delay can represent the wake-up-related capability of the first terminal device.

As an example, the capability information reported by the first terminal device can directly include the minimum wake-up delay of the second communication module.

As an example, the first terminal device can report whether the first terminal device supports the LP-WUS function. For instance, the network device may specify a reference value for the wake-up delay, and terminal devices supporting the LP-WUS function can achieve a wake-up delay equal to or less than the reference value.

As an example, the first terminal device may report one value (e.g., 2, 3, 4, etc.) or multiple values (e.g., a combination of integers) for the wake-up delay from M candidate values via a capability report. The minimum wake-up delay may represent the minimum time interval between the first communication module performing LP-WUS reception and the second communication module (MR) starting PDCCH monitoring.

In one embodiment of the above example, the first terminal device may select the minimum wake-up delay from M candidate values based on actual communication requirements and report the minimum wake-up delay to the network device via the capability report. All M candidate values may represent the wake-up delay of the first terminal device.

In another embodiment of the above example, the first terminal device may report M candidate values via the capability report, and the network device may select one value from M candidate values based on the PO configuration and indicate the selected value from M candidate values to the first terminal device via the first wake-up signal.

Optionally, the capability information reported by the first terminal device may further include an offset reference between LO and PO. The offset value between LO and PO may be configured by the network device. The network device may determine a single offset between the LO and PO corresponding to the first terminal device based on the capability report of the first terminal device.

As an example, when the single offset is configured by the network device, this parameter (that is, the single offset) depends on the capability of the first terminal device to monitor LP-WUS. If the first terminal device has sufficient time to monitor LP-WUS, the first terminal device may monitor paging messages on the PO based on LP-WUS and the single offset indication to save power. If the first terminal device does not have enough time to be waked up, the first terminal device may treat the paging messages on the PO monitoring as a legacy behavior.

As an example, in the capability information reported by the first terminal device, the first terminal device may report a minimum time offset value for each subcarrier spacing (SCS). For instance, different SCSs may have different minimum time offset values. The network device may configure an offset value based on the capability information reported by the first terminal device.

As an example, in RRC idle/inactive mode, terminal devices with different MR ramp-up times and different sleep states may be supported to be waked up. For instance, the time offset value configured by the network device may ensure that terminal devices with longer ramp-up times can be awakened after the minimum time offset, so terminal devices with shorter ramp-up times can also turn on their MR within this minimum time offset.

From the previous discussion, the first information can be carried in multiple ways. Taking how the symbols generated by LP-WUS OOK carry information as an example, the first information may have two design approaches: bitmap-based and codepoint-based. In other words, the first information may indicate whether the second communication module should be awakened via a bitmap or codepoint value. Below, the LP-WUS design is used as an example for explanation.

In some embodiments, for bitmap-based LP-WUS, a single bit may indicate whether the second communication module should be awakened for the first terminal device or all terminal devices in a terminal device subgroup. For example, in an N-bit-long bitmap sequence, each bit may represent a wake-up status of the terminal device subgroup. As one implementation, by initializing the bitmap, a bitmap of length N with an initial state of all 0s (or all 1s) can be generated to indicate that no terminal devices need to be waked up. Based on the list of terminal devices requiring to be waked up, bits in the corresponding positions are set to 1 (or 0). Each terminal device subgroup is assigned a unique identifier (ID) ranging from 0 to N−1. After receiving the bitmap signal in the specified time window, the first terminal device may decode the bitmap based on the ID of the terminal device. If the bit in the corresponding position is 1 (or 0), the first terminal device may enter the wake-up state.

For a bitmap-based LP-WUS with N bits, regardless of values of the other N−1 bits, whether the first terminal device needs to be waked up depends solely on the bit associated with the subgroup to which the first terminal device belongs. However, to detect the single bit associated with the subgroup to which the first terminal device belongs, the first communication module need also detect the other N−1 bits. If any of the other N−1 bits is not correctly detected, the cyclic redundancy check (CRC) will fail, and the LP-WUR will discard the entire bitmap. This is also a main reason why bitmap-based LP-WUS may have a higher miss detection rate.

In some embodiments, codepoint-based LP-WUS may be at least configured to indicate information for a certain number of device subgroups. For example, all information carried by the LP-WUS may determine whether the first terminal device or the second communication module needs to be waked up. Codepoint-based LP-WUS can be implemented via sequence selection or encoded bit blocks. In codepoint-based LP-WUS generation using CRC-based bit blocks, the subgroup ID of the first terminal device is first mapped to an encoding, a sequence, or a bit block in binary numbers, of the subgroup index. Then, a polynomial-based CRC sequence, i.e., each row in the matrix, is applied to generate the OOK symbols of the LP-WUS. The generated sequence may not have ideal autocorrelation/cross-correlation properties like Gold, M, or Walsh sequences.

As an example, the encoding method can be any of the following: one-hot encoding, binary encoding, Gray code, Huffman encoding, waveform coding, differential coding, and the like. The specific encoding method chosen depends on the requirements and environmental conditions of the particular disclosure. Combining CRC to generate a codepoint-based LP-WUS can effectively improve the reliability and accuracy of the wake-up signal.

As an embodiment, one-hot encoding combined with CRC is used to generate the codepoint-based LP-WUS. Taking the subgroup IDs and one-hot encodings corresponding to the subgroup IDs in Table 3 as an example, the encoding has only one position with a value of 1, while the remaining positions are 0. As shown in Table 1, assuming there are 8 subgroup IDs (0 to 7) in Table 3, each subgroup ID is represented by an 8-bit vector. Only the bit corresponding to the subgroup ID position is 1, and bits corresponding to all the other positions are 0. The CRC bits are check bits calculated from the original data to ensure no errors occur during transmission of the data. In practice, the one-hot encoded data is appended with the corresponding CRC check bits. The one-hot encoding and the calculated CRC bits are combined to form the final bit block, which is transmitted by the base station over the control channel.

TABLE 3

| subgroup ID | one-hot encoding |
|---|---|
| 0 | 10000000 |
| 1 | 01000000 |
| 2 | 00100000 |
| 3 | 00010000 |
| 4 | 00001000 |
| 5 | 00000100 |
| 6 | 00000010 |
| 7 | 00000001 |

As an embodiment, binary encoding is used. For example, if there are 8 subgroup IDs (0 to 7), each subgroup ID is represented by a 3-bit binary code.

As an embodiment, Gray code is used, where each subgroup ID is represented by a 3-bit Gray code.

As an embodiment, Manchester encoding is applied to a design of a sequence-based (or bitmap-based) LP-WUS. Manchester decoding is performed bit by bit. Specifically, the second communication module first calculates two energy values based on the first and second halves of the received Manchester-encoded OOK symbols. The energy increment per bit is obtained by subtracting the right-side energy (Eb) from the left-side energy (Ea). The absolute value of this energy increment essentially represents the reference signal received power (RSRP). Detection or comparison is then performed to determine whether the received waveform contains a valid wake-up signal or a sequence associated with the first terminal device or the subgroup to which the first terminal device belongs. Through this two-stage LP-WUS detection process, Manchester encoding does not affect properties of the underlying WUS sequence.

Comparing bitmap-based and codepoint-based designs, a key difference lies in whether the LP-WUS contains interference information unrelated to the wake-up information of the first terminal device. Taking Manchester encoding as an example, for a bitmap-based LP-WUS, a sign of the per-bit energy increment is difficult to detect as 1 or 0, requiring CRC verification of a hard-detected 0/1 bit sequence of the entire LP-WUS. For a sequence-based LP-WUS, the per-bit energy increment of the entire sequence is correlated with the target sequence associated with the first terminal device, and a correlation result is compared with a sequence detection threshold.

The method embodiments of this disclosure have been described in detail above with reference to FIGS. 1 to 9. Below, the device embodiments of this disclosure are described in detail with reference to FIGS. 10 to 12. It should be understood that the description of the device embodiments corresponds to the description of the method embodiments, and thus, details not described here can be found in the preceding method embodiments.

Figure 10:
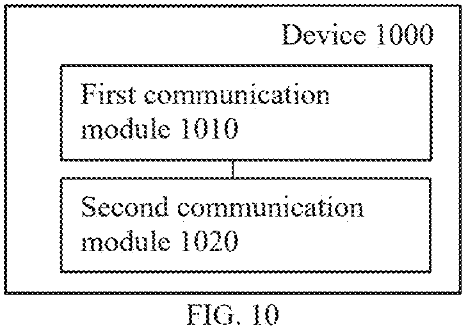
FIG. 10 is a schematic structural diagram of an device for wireless communication according to an embodiment of this disclosure.

FIG. 10 is a schematic block diagram of an device for wireless communication according to an embodiment of this disclosure. The device 1000 may be any of the first terminal devices described above. The device 1000 shown in FIG. 10 includes a first communication module 1010 and a second communication module 1020.

The first communication module 1010 is configured to receive a first wake-up signal at a first occasion, where the first wake-up signal is configured to wake up the second communication module of the first terminal device.

The second communication module 1020 is configured to perform paging detection at a second occasion. The first occasion is determined based on the first waked terminal device group to which the first terminal device belongs. The second occasion is determined based on the first waked terminal device group and the first paging device group to which the first terminal device belongs.

Optionally, all terminal devices in the first waked terminal device group correspond to the first occasion. All terminal devices in the first paging device group are associated with the same PEI (Paging Early Indication) and/or PO (Paging Occasion).

Optionally, the terminal devices in the first waked terminal device group may partially or fully overlap with those in the first paging device group.

Optionally, after receiving the first wake-up signal at the first occasion, the device 1000 further includes: a first processing module, configured to determine whether to monitor the PEI corresponding to the first terminal device based on the wake-up latency of the second communication module, where the PEI corresponding to the first terminal device corresponding to one or more reception occasions of the first wake-up signal.

Optionally, the first occasion is the first reception occasion of the one or more reception occasions. The first processing module is further configured to monitors the PEI if the time interval between the first occasion and the PEI corresponding to the first terminal device is greater than the minimum wake-up latency of the second communication module. Otherwise, the first processing module does not monitor the PEI if the time interval between the first occasion and the PEI corresponding to the first terminal device is equal to or less than the minimum wake-up latency of the second communication module.

Alternatively, the first waked terminal device group is one of multiple waked terminal device groups, the plurality of waked terminal device groups correspond to a plurality of occasions. After receiving the first wake-up signal at the first occasion, the device 1000 further includes: a second processing module, configured to determine whether to monitor the PEI corresponding to the first terminal device based on the position of the first occasion among the multiple occasions.

Alternatively, when the first occasion is the first one of the multiple occasions, the second processing module is further configured to monitor the PEI corresponding to the first terminal device. Otherwise, when the first occasion is any occasion other than the first occasion of the multiple occasions, the second processing module does not monitor the PEI corresponding to the first terminal device.

Additionally, the first terminal device is one of multiple terminal devices divided into multiple waked terminal device groups (including the first waked terminal device group). The grouping of the multiple waked terminal device groups is based on one or more of the following: wake-up latencies of the multiple terminal devices; IDs of the multiple terminal devices; the number of different types of waked terminal device groups among multiple waked terminal device groups.

Additionally, the second communication module is further configured to transmit capability information of the first terminal device to the network device, where the capability information indicates the minimum wake-up latency of the second communication module.

Additionally, the first wake-up signal is configured to carry first information, which indicates (via bitmap or codepoint) whether the second communication module should be waked up. The maximum number of device subgroups associated with the PO of the first terminal device is related to the maximum number of bits in the first information.

Additionally, the first occasion is one of multiple occasions, and multiple occasions correspond one-to-one with multiple POs. The cycle of the multiple occasions is the same with the DRX cycle.

Additionally, the index of the first occasion is determined based on the index of the PO associated with the first terminal device.

Additionally, the first occasion corresponds to a first reference synchronization signal, and the time-domain position of the first occasion is determined by the time-domain position of first reference synchronization signal.

Additionally, the first occasion is determined according to the following formula:

$$(X + LO_{offset}) \bmod T_{LO} = (\mathrm{UE\_ID} \bmod N_{LO}) * \left(\frac{T_{LO}}{N_{LO}}\right);$$

where X represents an offset of the first reference synchronization signal, LO offset represents an offset of the first occasion, $T_{LO}$ represents the first cycle corresponding to the first occasion, UE_ID represents the ID of the first terminal device, and $N_{LO}$ represents the number of occasions within the first cycle.

Optionally, the second occasion is one of multiple POs corresponding to the first terminal device, where the time-domain positions of the multiple POs are determined based on the wake-up latency of the first terminal device.

Optionally, the multiple POs include the second occasion $T_{po}$ (where the first terminal device currently performs paging detection) and a third occasion $T_{next\_po}$ (where paging detection is performed next). The third occasion $T_{next\_po}$ is:

$$T_{next\_po} = T_{wakeup} + (T_{po} - (T_{wakeup} \bmod T_{po}));$$

where $T_{wakeup}$ represents the wake-up latency for the first terminal device to perform the next paging detection.

Figure 11:
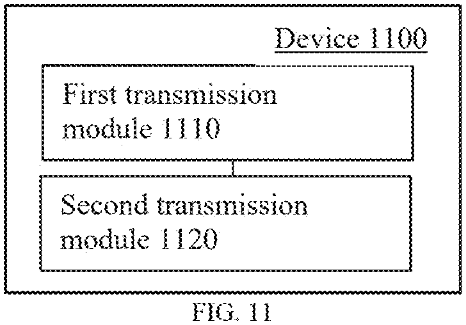
FIG. 11 is a schematic structural diagram of another device for wireless communication according to an embodiment of this disclosure.

FIG. 11 is a schematic block diagram of another device for wireless communication according to an embodiment of this disclosure. The device 1100 may be any of the network devices described above. The device 1100 shown in FIG. 11 includes a first transmission module 1110 and a second transmission module 1120.

The first transmission module 1110 is configured to transmit a first wake-up signal to a first terminal device at a first occasion, where the first terminal device includes a first communication module and a second communication module. The first wake-up signal is used to wake up the second communication module of the first terminal device.

The second transmission module 1120 is configured to transmit paging information corresponding to the first terminal device at a second occasion. The first wake-up signal is received by the first communication module, and the paging information is detected by the second communication module. The first occasion is determined based on the first waked terminal device group to which the first terminal device belongs. The second occasion is determined based on the first waked terminal device group and the first paging device group to which the first terminal device belongs.

Optionally, all terminal devices in the first waked terminal device group correspond to the first occasion. All terminal devices in the first paging device group are associated with the same PEI (Paging Early Indication) and/or PO (Paging Occasion).

Optionally, the terminal devices in the first waked terminal device group and the terminal devices in the first paging device group are partially or entirely the same.

Optionally, the wake-up latency of the second communication module is configured to determine whether the first terminal device monitors the PEI corresponding to the first terminal device, where the PEI corresponding to the first terminal device corresponds to one or more reception occasions of the first wake-up signal.

Optionally, the first occasion is the first reception occasion of the one or more reception occasions. When the time interval between the first occasion and the PEI corresponding to the first terminal device is greater than the minimum wake-up latency of the second communication module, the PEI corresponding to the first terminal device is monitored by the first terminal device; or, when the time interval between the first occasion and the PEI corresponding to the first terminal device is less than or equal to the minimum wake-up latency of the second communication module, the PEI corresponding to the first terminal device is not monitored by the first terminal device.

Optionally, the first waked terminal device group is one of a plurality of waked terminal device groups, and the plurality of waked terminal device groups correspond to a plurality of occasions. The position of the first occasion of the plurality of occasions is used to determine whether the first terminal device monitors the PEI corresponding to the first terminal device.

Optionally, when the first occasion is the first occasion of the plurality of occasions, the PEI corresponding to the first terminal device is monitored by the first terminal device; or, when the first occasion is any occasion of the plurality of occasions other than the first occasion of the plurality of occasions, the PEI corresponding to the first terminal device is not monitored by the first terminal device.

Optionally, the first terminal device is one of a plurality of terminal devices, and the plurality of terminal devices are divided into a plurality of waked terminal device groups including the first waked terminal device group. The plurality of waked terminal device groups are divided based on one or more of types of information of the following: the wake-up latencies of the plurality of terminal devices; the IDs of the plurality of terminal devices; and the number of different types of waked terminal device groups among the plurality of waked terminal device groups.

Optionally, the device 1100 further includes a receiving unit, configured to receive capability information transmitted by the first terminal device, where the capability information is configured to indicate the minimum wake-up latency of the second communication module.

Optionally, the first wake-up signal is configured to carry first information, and the first information indicates whether the second communication module is awakened via the bitmap or codepoint value. The maximum number of device subgroups associated with the PO of the first terminal device is related to the maximum number of bits of the first information.

Optionally, the first occasion is one of multiple occasions, and the multiple occasions have a one-to-one correspondence with multiple POs. The cycle of the multiple occasions is the same as the DRX cycle.

Optionally, the index of the first occasion is determined based on the index of the PO associated with the first terminal device.

Optionally, the first occasion corresponds to a first reference synchronization signal, and the time-domain position of the first occasion is determined based on the time-domain position of the first reference synchronization signal.

Optionally, the first occasion is determined according to the following formula:

$$(X + LO_{offset})\bmod T_{LO} = (\mathrm{UE\_ID}\bmod \mathrm{N}_{LO}) * \left(\frac{T_{LO}}{N_{LO}}\right);$$

where X represents an offset of the first reference synchronization signal, $LO_{offset}$ represents an offset of the first occasion, $T_{LO}$ represents the first cycle corresponding to the first occasion, UE_ID represents the ID of the first terminal device, and $N_{LO}$ represents the number of occasions within the first cycle.

Optionally, the second occasion is one of multiple POs corresponding to the first terminal device, where the time-domain positions of the multiple POs are determined based on the wake-up latency of the first terminal device.

Optionally, the multiple POs include the second occasion $T_{po}$ (where the first terminal device currently performs paging detection) and a third occasion $T_{next\_po}$ (where paging detection is performed next). The third occasion $T_{next\_po}$ is:

$$T_{next\_po} = T_{wakeup} + (T_{po} - (T_{wakeup}\bmod T_{po}));$$

where $T_{wakeup}$ represents the wake-up latency for the first terminal device to perform the next paging detection.

Figure 12:
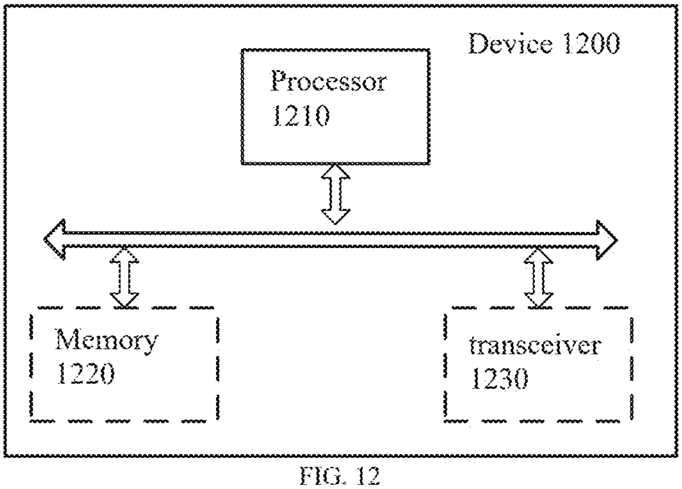
FIG. 12 is a schematic structural diagram of a communication device according to an embodiment of this disclosure.

FIG. 12 illustrates a schematic structural diagram of a communication device according to an embodiment of this disclosure. The dashed lines in FIG. 12 indicate that the unit or module is optional. The device 1200 may be used to implement the method described in the foregoing method embodiments. The device 1200 may be a chip, a terminal device, or a network device.

The device 1200 may include one or more processors 1210. The processor 1210 may support the device 1200 in implementing the method described in the foregoing method embodiments. The processor 1210 may be a general-purpose processor or a dedicated processor. For example, the processor may be a central processing unit (CPU). Alternatively, the processor may also be other general-purpose processors, a digital signal processor (DSP), an disclosure-specific integrated circuit (ASIC), a field-programmable gate array (FPGA), or other programmable logic devices, discrete gates or transistor logic devices, discrete hardware components, and the like. A general-purpose processor may be a microprocessor, or the processor may also be any conventional processor.

The device 1200 may further include one or more memories 1220. A program is stored on the memory 1220, and the program may be executed by the processor 1210, enabling the processor 1210 to perform the method described in the foregoing method embodiments. The memory 1220 may be independent of the processor 1210 or may be integrated into the processor 1210.

The device 1200 may further include a transceiver 1230. The processor 1210 may communicate with other devices or chips via the transceiver 1230. For example, the processor 1210 may transmit and receive data with other devices or chips through the transceiver 1230.

Embodiments of this disclosure further provides a computer-readable storage medium for storing a program. The computer-readable storage medium may be applied to the terminal device or the network device provided in the embodiments of this disclosure, and the program causes a computer to perform the method performed by the terminal device or the network device in the various embodiments of this disclosure.

The computer-readable storage medium may be any available medium that can be read by a computer or a data storage device such as a server or a data center that integrates one or more available medium. The available medium may be a magnetic medium (e.g., a floppy disk, a hard disk, or a magnetic tape), an optical medium (e.g., a digital video disc (DVD)), or a semiconductor medium (e.g., a solid-state drive (SSD)), and the like.

Embodiments of this disclosure further provides a computer program product. The computer program product includes a program. The computer program product may be applied to the terminal device or network device provided in the embodiments of this disclosure, and the program causes a computer to perform the method performed by the terminal device or network device in the various embodiments of this disclosure.

In the foregoing embodiments, the methods may be implemented entirely or partially by software, hardware, firmware, or any combination thereof. When implemented by software, the methods may be implemented entirely or partially in the form of a computer program product. The computer program product includes one or more computer instructions. When the computer program instructions are loaded and executed on a computer, the processes or functions described in the embodiments of this disclosure are generated entirely or partially. The computer may be a general-purpose computer, a special-purpose computer, a computer network, or other programmable devices. The computer instructions may be stored in a computer-readable storage medium or transmitted from one computer-readable storage medium to another. For example, the computer instructions may be transmitted from a website, a computer, a server, or a data center to another website, computer, server, or data center via wired (e.g., coaxial cable, optical fiber, or digital subscriber line (DSL)) or wireless (e.g., infrared, radio, or microwave) means.

Embodiments of this disclosure further provides a computer program. The computer program may be applied to the terminal device or the network device provided in the embodiments of this disclosure, and the computer program causes a computer to perform the method performed by the terminal device or the network device in the various embodiments of this disclosure.

In this disclosure, the terms "system" and "network" may be used interchangeably. Additionally, the terms used in this disclosure are only intended to explain specific embodiments of this disclosure and are not intended to limit this disclosure. Terms such as "first," "second," "third," and "fourth" in the specification, claims, and drawings of this disclosure are used to distinguish between different objects and not to describe a specific order. Furthermore, the terms "include," "have," and any variations thereof are intended to cover non-exclusive inclusion.

In the embodiments of this disclosure, "indication" may refer to direct indication, indirect indication, or a representation of an association relationship. For example, "A indicates B" may mean that A directly indicates B (e.g., B can be obtained through A), that A indirectly indicates B (e.g., A indicates C, and B can be obtained through C), or that there is an association relationship between A and B.

In the embodiments of this disclosure, the term "correspond" may indicate a direct or indirect correspondence, an association relationship, an indication or being indicated/a configuration or being configured in relationships or other relationships between two entities.

In the embodiments of this disclosure, "predefined" or "preconfigured" may be implemented by pre-storing corresponding codes, tables, or other means in a device (e.g., a terminal device or a network device) to indicate relevant information. This disclosure does not limit the specific implementation. For example, "predefined" may refer to definitions in a protocol.

In the embodiments of this disclosure, the "protocol" may refer to standard protocols in the field of communications, such as LTE protocols, NR protocols, and related protocols applied in future communication systems. This disclosure does not limit the scope of such protocols.

In the embodiments of this disclosure, "determining B based on A" does not mean that B is determined solely based on A; B may also be determined based on A and/or other information.

In the embodiments of this disclosure, the term "and/or" describes an association relationship between associated objects, indicating that three relationships may exist. For example, "A and/or B" may represent: A alone, both A and B, or B alone. Additionally, the character "/" in this document generally indicates an "or" relationship between the associated objects.

In the embodiments of this disclosure, the sequence numbers of the processes do not imply an order of execution. The execution order of the processes should be determined by functions and internal logic of the processes and should not impose any limitation on the implementation of the embodiments of this disclosure.

In the several embodiments provided in this disclosure, it should be understood that the disclosed systems, devices, and methods may be implemented in other ways. For example, the described device embodiments are merely illustrative. For instance, the division of units is only a logical division; in actual implementation, there may be other division methods (e.g., multiple units or components may be combined or integrated into another system). Some features may be omitted or not executed. Additionally, the displayed or discussed mutual couplings, direct couplings, or communication connections may be implemented through some interfaces, and indirect couplings or communication connections between devices or units may be electrical, mechanical, or of other forms.

The units described as separate components may or may not be physically separated. The components displayed as units may or may not be physical units, meaning they may be located in one place or distributed across multiple network units. Some or all of the units may be selected according to actual needs to achieve objectives of the embodiments of this disclosure.

Furthermore, the functional units in the various embodiments of this disclosure may be integrated into one processing unit, or each unit may exist physically alone, or two or more units may be integrated into one unit.

The foregoing descriptions are merely specific implementations of this disclosure. However, the scope of protection of this disclosure is not limited thereto. Any person skilled in the art can easily conceive of modifications or replacements within the technical scope disclosed in this disclosure, which should be covered by the protection scope of this disclosure. Therefore, the protection scope of this disclosure shall be subject to the protection scope of the claims.

What is claimed is:

1. A method for wireless communication, comprising:

receiving a first wake-up signal at a first occasion, wherein the first wake-up signal is to wake up a second communication module of a first terminal device, wherein the first terminal device comprises a first communication module and the second communication module, and the first wake-up signal is received through the first communication module of the first terminal device; and performing paging detection at a second occasion, wherein the paging detection is performed by the second communication module, the first occasion corresponds to a first waked terminal device group to which the first terminal device belongs, and the second occasion corresponds to at least one of the first waked terminal device group or a first paging device group to which the first terminal device belongs, wherein the second occasion is one of a plurality of paging occasions (POs) corresponding to the first terminal device, and time-domain positions of the plurality of POs are related to a wake-up latency of the first terminal device.

2. The method according to claim 1, wherein multiple terminal devices in the first waked terminal device group correspond to the first occasion, and multiple terminal devices in the first paging device group are associated with at least one of a same paging early indication (PEI) or a same PO.

3. The method according to claim 1, wherein terminal devices in the first waked terminal device group overlap at least partially with terminal devices in the first paging device group.

4. The method according to claim 1, comprising:

after receiving the first wake-up signal at the first occasion, determining whether to monitor a PEI corresponding to the first terminal device based on a wake-up latency of the second communication module, wherein the PEI corresponding to the first terminal device corresponds to one or more reception occasions of the first wake-up signal.

5. The method according to claim 4, wherein the first occasion is a first reception occasion among the one or more reception occasions, and the method comprises:

in a case that a time interval between the first occasion and the PEI corresponding to the first terminal device is greater than a minimum wake-up latency of the second communication module, monitoring the PEI corresponding to the first terminal device; or in a case that the time interval between the first occasion and the PEI corresponding to the first terminal device is less than or equal to the minimum wake-up latency of the second communication module, not monitoring the PEI corresponding to the first terminal device.

6. The method according to claim 1, wherein the first waked terminal device group is one of a plurality of waked terminal device groups, the plurality of waked terminal device groups corresponding to a plurality of occasions, and the method comprises:

after receiving the first wake-up signal at the first occasion, determining whether to monitor a PEI corresponding to the first terminal device based on a position of the first occasion among the plurality of occasions.

7. The method according to claim 6, wherein the method further comprises:

in a case that the first occasion is the first occasion among the plurality of occasions, monitoring the PEI corresponding to the first terminal device; or in a case that the first occasion is any occasion among the plurality of occasions other than the first occasion, not monitoring the PEI corresponding to the first terminal device.

8. The method according to claim 1, wherein the first terminal device is one of a plurality of terminal devices, the plurality of terminal devices are divided into a plurality of waked terminal device groups including the first waked terminal device group, and the plurality of waked terminal device groups are divided based on one or more of the following information:

wake-up latencies of the plurality of terminal devices;

identifiers (IDs) of the plurality of terminal devices; or a number of different types of waked terminal device groups among the plurality of waked terminal device groups.

9. The method according to claim 1, wherein the method further comprises:

transmitting capability information of the first terminal device to a network device, wherein the capability information indicates a minimum wake-up latency of the second communication module.

10. The method according to claim 1, wherein the first wake-up signal carries first information, the first information indicates whether the second communication module is waked up through a bitmap or a codepoint value, and a maximum number of device subgroups of a PO associated with the first terminal device is related to a maximum number of bits of the first information.

11. The method according to claim 1, wherein the first occasion is one of a plurality of occasions, the plurality of occasions correspond one-to-one with a plurality of POs, and a cycle of the plurality of occasions is the same as a discontinuous reception (DRX) cycle.

12. The method according to claim 1, wherein an index of the first occasion is determined based on an index of a PO associated with the first terminal device.

13. The method according to claim 1, wherein the first occasion corresponds to a first reference synchronization signal, and a time-domain position of the first occasion is determined based on a time-domain position of the first reference synchronization signal.

14. The method according to claim 13, wherein the first occasion is determined according to the following formula:

$$(X + LO_{offset}) \bmod T_{LO} = (\mathrm{UE\_ID} \bmod \mathrm{N}_{LO}) * \left(\frac{T_{LO}}{N_{LO}}\right),$$

wherein X represents an offset of the first reference synchronization signal, $LO_{offset}$ represents an offset of the first occasion, $T_{LO}$ represents a first cycle corresponding to the first occasion, $UE_{ID}$ represents an ID of the first terminal device, and $N_{LO}$ represents a number of occasions within the first cycle.

15. The method according to claim 1, wherein the plurality of POs include the second occasion $T_{po}$ where the first terminal device currently performs paging detection and a third occasion $T_{next_{po}}$ where the paging detection is performed next, the third occasion $T_{next_{po}}$ is: $I_{next_{po}} = T_{wakeup} + (T_{po} - (T_{wakeup} \bmod T_{po}))$, wherein $T_{wakeup}$ represents the wake-up latency for the first terminal device to perform a next paging detection.

16. A method for wireless communication, comprising:

transmitting, to a first terminal device, a first wake-up signal at a first occasion, wherein the first terminal device comprises a first communication module and a second communication module, the first wake-up signal is configured to wake up the second communication module of the first terminal device, and the first wake-up signal is transmitted by using a signal associated with the first communication module of the first terminal device; and transmitting paging information corresponding to the first terminal device at a second occasion, wherein the paging information is transmitted by using a signal associated with the second communication module, the first occasion corresponds to a first waked terminal device group to which the first terminal device belongs, and the second occasion corresponds to at least one of the first waked terminal device group or a first paging device group to which the first terminal device belongs, wherein the second occasion is one of a plurality of paging occasions (POs) corresponding to the first terminal device, and time-domain positions of the plurality of POs are related to a wake-up latency of the first terminal device.

17. An apparatus, comprising:

at least one processor; and one or more non-transitory computer-readable storage media coupled to the at least one processor and storing programming instructions for execution by the at least one processor, wherein the programming instructions, when executed, cause the apparatus to perform operations comprising:

receiving a first wake-up signal at a first occasion, wherein the first wake-up signal is to wake up a second communication module of a first terminal device, wherein the first terminal device comprises a first communication module and the second communication module, and the first wake-up signal is received through the first communication module of the first terminal device; and performing paging detection at a second occasion, wherein the paging detection is performed by the second communication module, the first occasion corresponds to a first waked terminal device group to which the first terminal device belongs, and the second occasion corresponds to at least one of the first waked terminal device group or a first paging device group to which the first terminal device belongs, wherein the second occasion is one of a plurality of paging occasions (POs) corresponding to the first terminal device, and time-domain positions of the plurality of POs are related to a wake-up latency of the first terminal device.

18. The apparatus according to claim 17, wherein multiple terminal devices in the first waked terminal device group correspond to the first occasion, and multiple terminal devices in the first paging device group are associated with at least one of a same paging early indication (PEI) or a same PO.

19. The apparatus according to claim 17, wherein terminal devices in the first waked terminal device group overlap at least partially with terminal devices in the first paging device group.

20. The apparatus according to claim 17, wherein the operations comprise:

transmitting capability information of the first terminal device to a network device, wherein the capability information indicates a minimum wake-up latency of the second communication module.

* * * * *